Dec. 17, 1935. F. R. TAISEY 2,024,191
PNEUMATIC DISPATCH SYSTEM
Filed Feb. 12, 1932
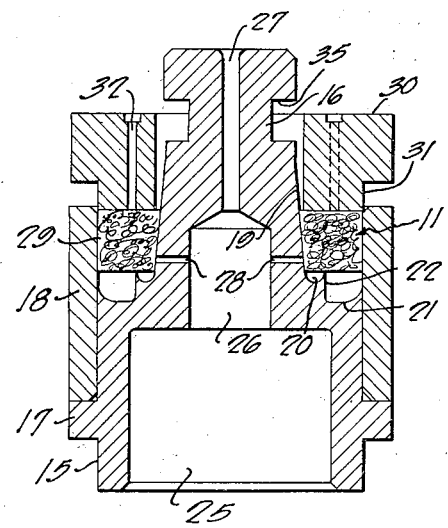
INVENTOR
FRED R. TAISEY Patented Dec. 17, 1935

2,024,191

UNITED STATES PATENT OFFICE 2,024,191

PNEUMATIC DISPATCH SYSTEM

Fred R. Taisey, Lowell, Mass., assignor to The Lamson Company, Syracuse, N. Y., a corporation of Massachusetts Application February 12, 1932, Serial No. 592,537

1 Claim. (Cl. 18—55)

This invention relates to improvement in a pneumatic dispatch system, and more particularly to the method for forming the felt head of a pneumatic dispatch carrier to the felt head so formed, and to the apparatus by which such method is carried out.

The felt heads to which this invention relates are annular and are mounted upon the ends of the carrier as shown in my copending application Serial No. 589,376 filed January 28, 1932. Previous to this invention it was the practice to form annular felt heads from a block or disk of felt cutting the central portion out in case of a block trimming off the projecting corners. Such treatment is wasteful and expensive because there is little use for the cut-out central part of felt or the trimmings. Moreover, the felt ring remaining after such treatment is not in the best condition to resist the wear of friction to which it is subjected during its use.

One object of this invention resides in a felt head made from a substantially longitudinal block of felt, which block is rolled into a ring and in the method of forming such head. A further object of this invention is to provide apparatus by which the head is formed and treated in order to render the felt compact and resistant to wear. Other objects will appear from a consideration of the following specification and of the drawing which forms a part thereof and in which:

Fig. 1 is a side elevation of a longitudinal block of felt from which the head is made, such head being indicated as completed in dotted lines;

Fig. 2 is a sectional view of an apparatus in which the head is treated, such head being shown positioned in the apparatus before the treatment is completed;

Fig. 3 is a view similar to Fig. 2, illustrating the position of the head in the machine when the operation is completed;

Fig. 4 is a plan view of a head made in accordance with this invention; and

Fig. 5 is a side elevation thereof with parts broken away.

The head is formed from a block of felt 10 which is preferably, though not necessarily, rectangular in cross-section. Such block is made of the proper length so that it may be formed into a ring 11, as indicated in dotted lines on Fig. 1, from which the head is made of the proper diameter. The ends 12 of the block abut and may be joined by the use of a suitable adhesive. After the ring has been so formed it is then subjected to pressure and heat in the manner about to be described.

One form of apparatus for completing the formation of the head is illustrated in Figs. 2 and 3 in the drawing, and comprises a cylindrical mold 15 having a central portion or post 16 and an annular flange or shoulder 17, a sleeve 18 which rests upon the shoulder 17 and an annular cap 30 which is adapted to pass over the post 16. The post 16 is conical at one part of its length to provide an inclined surface 19 which terminates in an annular recess or pocket 20 formed in the mold. A second annular recess or pocket 21 formed in the mold is separated from the recess 20 by an annular wall 22 which, as shown particularly in Fig. 1, preferably terminates in a sharp line. The mold 15 is hollow, having an enlarged chamber 25 at the bottom, a second and smaller chamber 26 leading from and directly connected to the chamber 25, a passage 27 which extends from the chamber 26 through the center of the post 16 and a plurality of radiating passages 28 which lead from the chamber 26 and terminate at the inclined surface 19.

When a felt head is to be made, the sleeve 18 is first placed on the shoulder 17 of the mold 15. As will be clear from an examination of Fig. 2, this sleeve coacts with the post 16 to form an annular recess 29 which has a substantially perpendicular outer wall and a tapered inner wall. The felt block 10, which has in the meantime been softened by the use of water, either hot or cold, or of steam, is then formed into the ring 11 and inserted into the recess 29, sufficient pressure being applied to seat the ring evenly upon the wall 22. The ends 12 may or may not have been previously rendered adhesive so that the abutting surfaces will adhere. The cap 30 is then slipped over the post 16 and rested upon the ring 11. As shown in Figs. 2 and 3, the cap 30 preferably terminates at its lower edge in an annular projection 31 of such dimensions that it will enter the recess 29 and has a plurality of vertical passages 32 therein. Pressure is then exerted in a press or by other means until the cap rests upon the upper edge of the sleeve 18. The cap is then secured in this position in any suitable manner as by means of a suitable key 34 which is tapered in the well known way and can be slipped into an annular pocket formed in the post.

The ring 11 forced downwardly by the cap enters and fills the recesses 20 and 21, and since the inner wall of the recess 29 is tapered, the body of the felt is perforce compressed laterally as well as vertically as the ring is formed into the head. During this operation some of the moisture in the ring will escape through the passages 28 in the post and also through passages 32 in the cap. The mold with the head formed therein is then heated, as by placing it in an oven until the head is approximately dry, the moisture having escaped through the passages 28 and 32 and then cooled. The head 40, into which the ring 11 has been converted under the combined action of heat and pressure, is removed. As shown in Figs. 4 and 5, the head 40 has on one side an outer rounded surface 41 and an inner rounded surface 42 separated by a sharp annular recess 43 which, as pointed out in my application above mentioned, facilitates the clamping of the felt head to the end of the carrier.

It is well known that the formation of felt sheets includes the steps of stretching the sheets from time to time in order to compact them and to set up a more or less definitive alignment of the fibers in one direction. Consequently, when, as here set forth, a ring is made by rolling a longitudinal block of felt the interrelation of the fibers throughout the entire periphery will be substantially uniform. The heads made according to this invention will therefore wear evenly throughout the periphery. The subjection of the rings to pressure obviously results in a more compact ring, and the application of heat to the ring during or after it is compressed into a head furthers this compactness.

While one embodiment of an apparatus for making the felt head in accordance with this invention has been shown and described, it will be understood that I am not limited thereto since other embodiments may be made or features of the described embodiment may be changed without departing from the spirit and scope of this invention as set forth in the following claim.

I claim:

The method of making a felt head for a pneumatic dispatch carrier from a longitudinal block of felt in a mold having a recess therein comprising the following steps; moistening the block, rolling the moistened block into a ring with the ends in abutment, placing the formed ring in the recess of the mold, applying pressure to the ring to compact the body thereof laterally and vertically, permitting any excess moisture to escape during the application of pressure and subjecting the compacted ring to heat to drive off additional moisture.

FRED R. TAISEY.